(12) United States Patent
Park

(10) Patent No.: US 9,090,292 B2
(45) Date of Patent: Jul. 28, 2015

(54) STRUCTURE OF REAR PACKAGE TRAY FOR VEHICLE

(71) Applicant: Hyundai Motor Company, Seoul (KR)

(72) Inventor: Hyeong-Gyu Park, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 31 days.

(21) Appl. No.: 13/916,241

(22) Filed: Jun. 12, 2013

(65) Prior Publication Data

US 2014/0284968 A1 Sep. 25, 2014

(30) Foreign Application Priority Data

Mar. 19, 2013 (KR) ........................ 10-2013-0028974

(51) Int. Cl.
  *B60J 7/00* (2006.01)
  *B62D 25/08* (2006.01)
(52) U.S. Cl.
  CPC ...................................... *B62D 25/08* (2013.01)
(58) Field of Classification Search
  CPC .. B60C 13/00; B60C 9/02; B65D 2571/0066; B65D 1/34; A47B 88/0003; B01D 35/027; B29C 45/1704; H01L 21/67383; A47C 1/124
  USPC .................... 296/193.08, 187.11, 187.12, 198
  See application file for complete search history.

(56) References Cited

U.S. PATENT DOCUMENTS

| 3,517,765 | A | * | 6/1970 | Eggert, Jr et al. | ............. 180/312 |
| 4,875,733 | A | * | 10/1989 | Chado et al. | ............. 296/203.04 |
| 4,950,025 | A | * | 8/1990 | Yoshii | ....................... 296/203.04 |
| 5,123,696 | A | * | 6/1992 | Watari | ....................... 296/203.04 |
| 5,427,425 | A | * | 6/1995 | Droesch | ........................... 296/50 |
| 5,580,121 | A | * | 12/1996 | Dange et al. | .............. 296/181.4 |
| 5,671,947 | A | * | 9/1997 | Henn | ............................ 280/756 |
| 5,788,322 | A | * | 8/1998 | Wolf et al. | ................. 296/181.4 |
| 6,402,209 | B2 | * | 6/2002 | McGuiness | .................. 293/133 |
| 6,796,600 | B1 | * | 9/2004 | Ferer et al. | ................. 296/146.1 |
| 7,325,865 | B2 | * | 2/2008 | Yamazaki | ............... 296/203.04 |
| 7,628,446 | B2 | * | 12/2009 | Harney et al. | ............ 296/203.04 |
| 7,806,467 | B2 | * | 10/2010 | Sangu | ...................... 296/203.04 |
| 7,954,887 | B2 | * | 6/2011 | Sakamoto et al. | ....... 296/193.08 |
| 7,954,888 | B2 | * | 6/2011 | Neumann et al. | ........ 296/193.08 |
| 8,118,341 | B2 | * | 2/2012 | Taneda | .......................... 296/37.2 |

(Continued)

FOREIGN PATENT DOCUMENTS

JP 2006-062443 A 3/2006
KR 10-2011-0060979 A 6/2011

*Primary Examiner* — Kiran B Patel
(74) *Attorney, Agent, or Firm* — McDermott Will & Emery LLP

(57) ABSTRACT

A structure of a rear package tray for a vehicle, which is mounted on body panels which vertically stand at both sides of a floor panel and positioned between an interior room and a trunk room of a vehicle. The structure includes: a side member mounted on the body panel with a front side member which is positioned at a relatively front side, and a rear side member which is positioned at a relatively rear side, coupled to each other; an upper member disposed at an upper side of the side member in a horizontal direction of a vehicle body; and a support member having one side connected to the upper member and the other side connected to the side member with an inclination to be spaced apart from a connection portion of the side member and the upper member. A reinforcing flange protrudes in a horizontal direction along one side edge of the support member.

5 Claims, 6 Drawing Sheets

(56) References Cited

U.S. PATENT DOCUMENTS

| | | | |
|---|---|---|---|
| 8,480,165 B2 * | 7/2013 | Koyama et al. | 296/203.04 |
| 8,511,731 B2 * | 8/2013 | Sakai | 296/24.4 |
| 8,517,460 B2 * | 8/2013 | Hoshino et al. | 296/193.08 |
| 8,696,050 B2 * | 4/2014 | Nakamura et al. | 296/193.06 |
| 8,789,876 B2 * | 7/2014 | Sera | 296/193.08 |
| 2004/0245807 A1 * | 12/2004 | Yakata et al. | 296/203.04 |
| 2006/0121795 A1 * | 6/2006 | Hashimura et al. | 439/681 |
| 2006/0197300 A1 * | 9/2006 | Nakashima et al. | 280/124.109 |
| 2007/0075568 A1 * | 4/2007 | Kim et al. | 296/193.08 |
| 2007/0138837 A1 * | 6/2007 | Tomioka | 296/203.04 |
| 2007/0158977 A1 * | 7/2007 | Yasukouchi et al. | 296/203.04 |
| 2007/0236049 A1 * | 10/2007 | Chapman et al. | 296/193.08 |
| 2008/0007093 A1 * | 1/2008 | Andou et al. | 296/193.08 |
| 2009/0085380 A1 | 4/2009 | Sakamoto et al. | |
| 2010/0133879 A1 * | 6/2010 | Leonetti et al. | 296/193.08 |
| 2013/0001986 A1 * | 1/2013 | Takenaka | 296/193.08 |
| 2013/0038079 A1 * | 2/2013 | Son | 296/29 |
| 2013/0241240 A1 * | 9/2013 | Tokumoto et al. | 296/193.08 |
| 2014/0152054 A1 * | 6/2014 | Yano | 296/193.08 |

\* cited by examiner

STRUCTURE OF REAR PACKAGE TRAY FOR VEHICLE

CROSS-REFERENCE TO RELATED APPLICATION

This application claims priority under 35 U.S.C. §119 to Korean Patent Application No. 10-2013-0028974, filed on Mar. 19, 2013, in the Korean Intellectual Property Office, the disclosure of which is incorporated herein by reference.

TECHNICAL FIELD

The present disclosure relates to a structure of a rear package tray for a vehicle, and more particularly, to a structure of a rear package tray for a vehicle, in which a flange is disposed at one side of a support member to reinforce rigidity and extended to a lower portion of a side member to provide rigidity more efficiently.

BACKGROUND

A rear package tray for a vehicle (particularly, a passenger vehicle of a hatch back type, a sedan type, a coupe type, or the like) refers to a vehicle body structure to partition an interior room and a trunk room of a vehicle, and is disposed between a position in a vehicle body where a rear seat is mounted and a position where the trunk room is formed to support rigidity of a vehicle body.

A package tray of the related art has a structure in which; semi-circular shaped rear fender panels are positioned on upper side where rear wheels are mounted at both sides of a floor panel configuring a bottom surface of the vehicle body and are mounted; side members are mounted on body panels (vehicle body panels) which vertically stand at the floor panel to face each other above both sides of the rear fender panels; and an upper member (a package tray panel) is disposed on each of the upper ends of the body panels positioned in a horizontal direction of the vehicle body.

The side members and the upper member are structures to partition the interior room and the trunk room of a vehicle and reinforce the vehicle body. In order to improve rigidity of the vehicle body, separate reinforcing members are additionally mounted or metal plates made of higher rigidity materials such as steel are used.

Herein the load and vibration may be concentrated where the side members and the upper member are connected, therefore it is required to develop an additional reinforced connection structure to provide durability.

However, because spaces of the interior room and the trunk room of the vehicle, mainly for those of medium and small sized vehicles, are narrow and small, there is a limitation in design structures to increase the sizes of the side members and upper member or to add reinforcing members.

SUMMARY

The present disclosure is made in an effort to describe a structure of a rear package tray for a vehicle to improve rigidity without enlarging the sizes of the side members and/or the upper member, particularly for medium and small sized vehicles with narrow and small spaces.

An embodiment of the present invention provides a structure of a rear package tray mounted on body panels which vertically stand at both sides of a floor panel and positioned between an interior room and a trunk room of a vehicle, the structure including: a (package tray) side member mounted on the body panel with a front side member positioned at a relatively front side and a rear side member positioned at a relatively rear side, are coupled to each other; a (package tray) upper member disposed at an upper side of the side member in a horizontal direction of a vehicle body; and a support member having one side connected to the upper member and the other side connected to the side member being spaced apart with an inclination between the side member and the upper member, in which a reinforcing flange protrudes in a horizontal direction along one side edge of the support member.

The reinforcing flange may include a first reinforcing flange positioned at an upper side and a second reinforcing flange extended downward from the first reinforcing flange. Both surfaces of the first reinforcing flange may be exposed, and one surface of the second reinforcing flange may be attached to an end of the front side member.

An edge of the front side member, to which the second reinforcing flange is attached, may be positioned in a vertical direction from a surface of the body panel; a lower end of the support member may have a body fastening portion which is in contact with the body panel as the rear side member has a closed section structure together with the front side member; the rear side member may have a cover portion which has a bent shape in order to cover the body fastening portion; and an edge of the rear side member may be attached to the other surface of the second reinforcing flange.

A reinforcing panel, which is attached to the floor panel and the body panel, may be attached to a lower end of the side member. The reinforcing panel may also have a welding hole to allow a welding gun to enter to weld the support member and the rear side member.

The structure presented in the present disclosure has a support member with a reinforcing flange without increasing the sizes of a side member and an upper member to secure spaces of an interior room and a trunk room of a vehicle as well as to improve rigidity, thereby improving a degree of freedom in the vehicle body design.

A second reinforcing flange of the reinforcing flange is attached to ends of the front side member and the rear side member and extended to a lower portion of the side member, which may improve rigidity more efficiently.

In addition, when an edge of the side member is curved such as in an "S" shape in accordance with a layout of a vehicle, the second reinforcing flange is configured (an edge of the support member and an edge of side member are extended downward to be close to the floor panel and attached to each other to configure the reinforcing flange), and therefore the structure of the present disclosure may be applied to various vehicles in different shapes.

In addition, because the side member and the support member provided by the present disclosure are attached to the floor panel and the body panel by welding via the reinforcing panel, the side member and the support member may be more rigidly mounted.

BRIEF DESCRIPTION OF THE DRAWINGS

The foregoing and other features of the present disclosure will be apparent from more particular description of embodiments of the present disclosure, as illustrated in the accompanying drawings in which like reference characters may refer to the same or similar parts throughout the different view. The drawings are not necessarily to scale, emphasis instead being placed upon illustrating the principles of the embodiments of the present disclosure.

DETAILED DESCRIPTION

Figure 1:
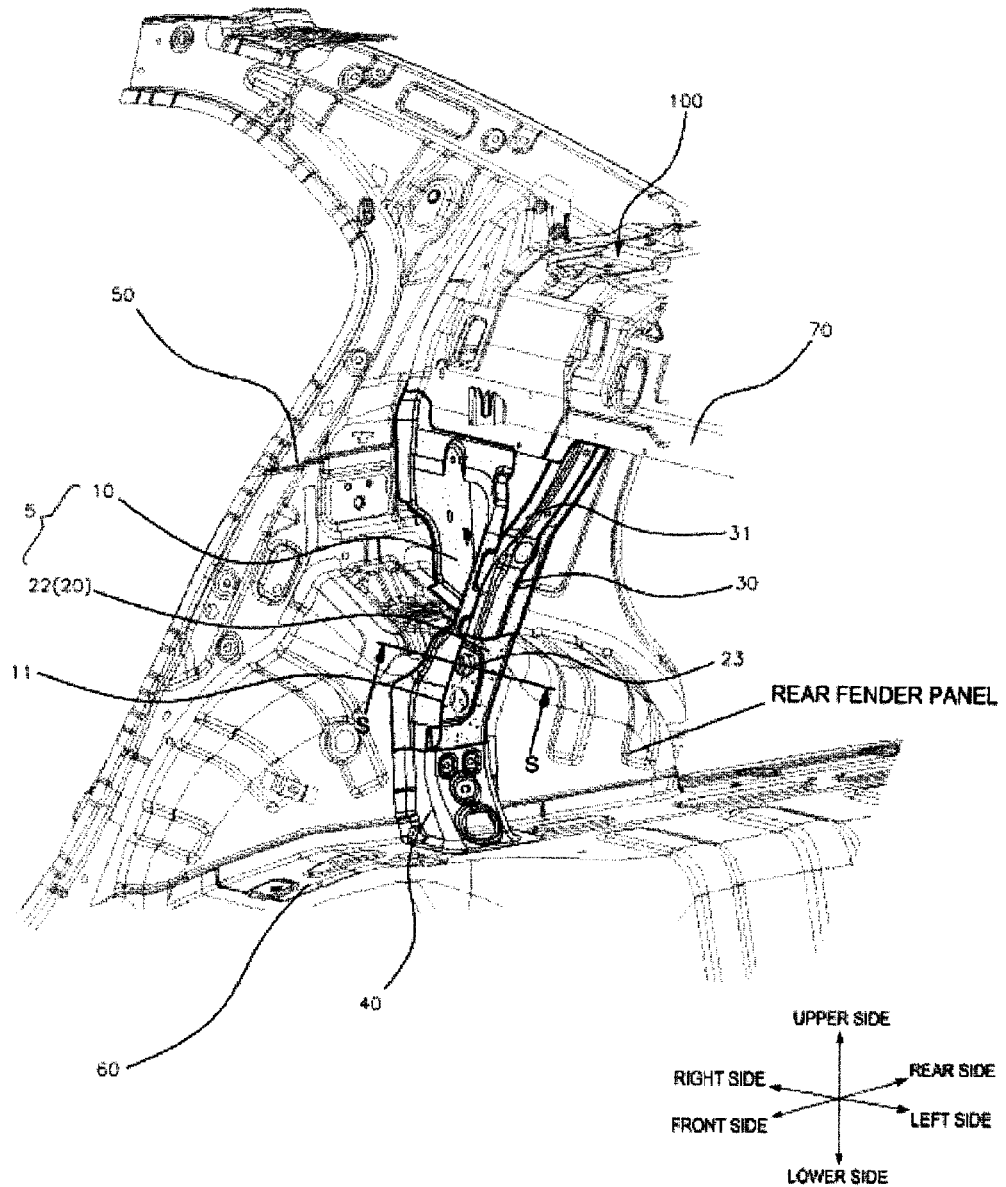
FIG. 1 is a perspective view illustrating an aspect of a structure of a rear package tray according to an embodiment of the present invention, which is seen from a front right side.

Examples of the invention will be described below in more detail with reference to the accompanying drawings. The examples may, however, be embodied in different forms and should not be construed as limited to the examples set forth herein. Like reference numerals may refer to like elements throughout the specification.

As described above, the present invention has been developed to satisfy target rigidity and durability of a vehicle body in accordance with design environment of a vehicle, in which shapes and measurements of a (package tray) side member and a (package tray) upper member are determined based on a type of rear suspension of a vehicle and/or a layout of a package tray. The present disclosure particularly provides a structure of a rear package tray for a vehicle, being practically applied to light and/or small vehicles which require restrictive design shapes and measurements of the side member and the upper member.

Figure 3:
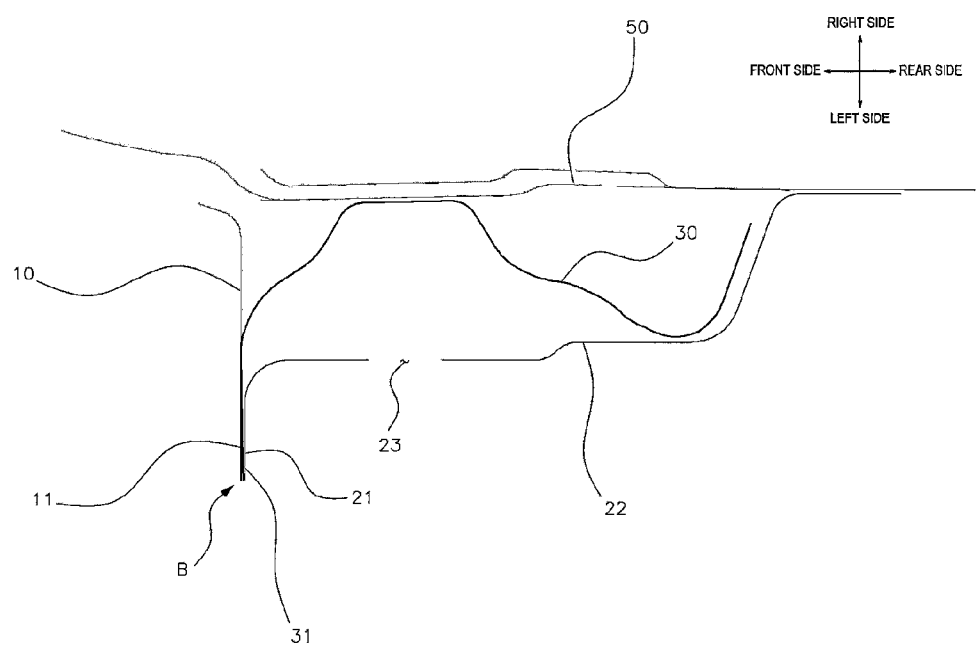
FIG. 3 is a cross-sectional view taken along line S-S of FIG. 1.

In addition, because rigidity may be reinforced where a curve is formed as a first reinforcing flange and a second reinforcing flange are continuously formed, target rigidity may be increased even with a side shape of the side member shaped in a curved line. A closed section structure may also be formed where a curve is formed (as illustrated in FIG. 3).

Hereinafter, a structure of a rear package tray 100 for a vehicle according to an embodiment of the present invention, which is mounted on a body panel 50 which vertically stands at both sides of a floor panel 60, and disposed between an interior room and a trunk room of a vehicle, will be described in more detail with reference to the drawings.

Figure 4:
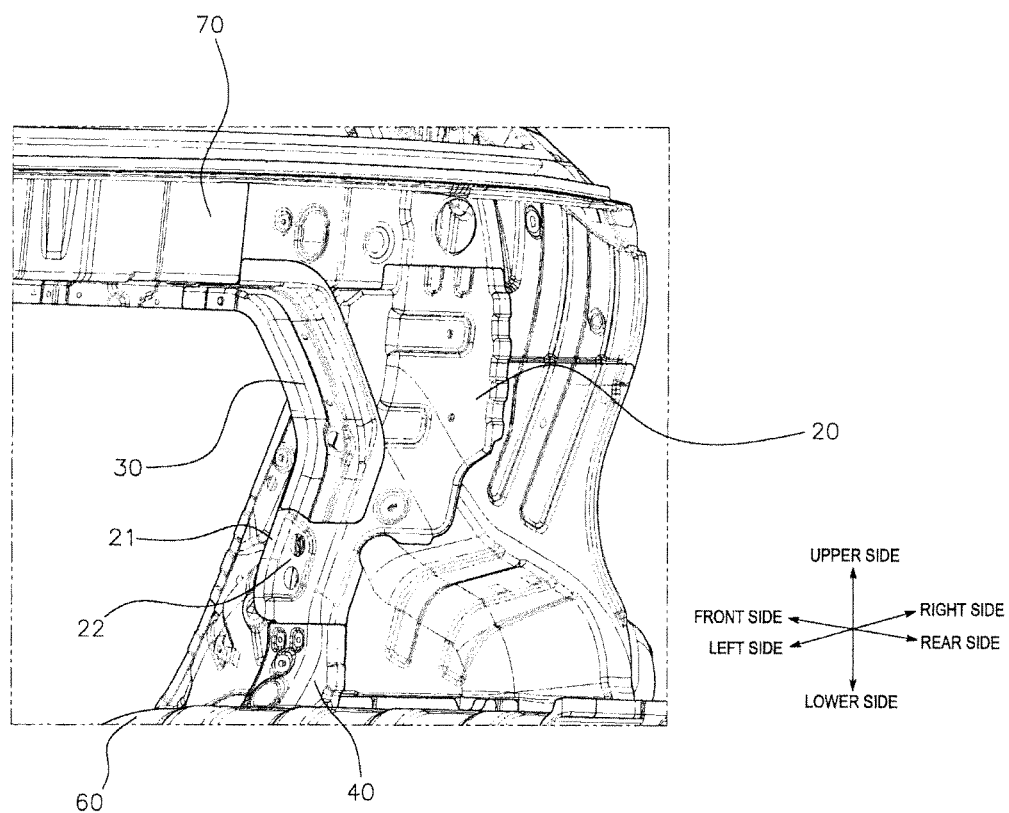
FIG. 4 is a perspective view and image illustrating aspects of a structure of a rear package tray, respectively, according to an embodiment of the present invention, which is seen from a rear side.

Referring to FIGS. 1 2, 3, and 4, a side member 5 in accord with the present disclosure is configured by coupling a front side member 10 and a rear side member 20. The front side member 10 with a flat panel shape as a whole is mounted vertically on the body panel 50 (more particularly, so that a lower end of the front side member 10 is connected to a rear fender panel configuring the body panel) and on lower side of an upper member 70, and positioned toward a relatively front side. The rear side member 20 is disposed at a relatively rear side having a bent panel shape as illustrated in FIG. 4 (so as to form a closed section).

The upper member 70 is connected to upper sides of both side members so that both ends of the upper member 70 are positioned in a horizontal direction (left and right directions) of a vehicle body. Further, a support member 30 like an inclined bridge pier structure is mounted to improve connection rigidity between the upper member 70 and the side member 5. That is, one side 32 of the support member 30 is connected to the upper member 70, the other side 33 of the support member 30 is connected to the side member 5, and the support member 30 has a predetermined inclined angle (of approximately 30° to 45°) to be spaced apart from where the side member 5 and the upper member 70 are connected (the connection portion 71 is labeled in FIG. 2).

In addition, a reinforcing flange 31 protrudes in a horizontal direction along an edge of the support member 30 according to the embodiment of the present invention (left to right direction illustrated in FIG. 1).

Figure 2:
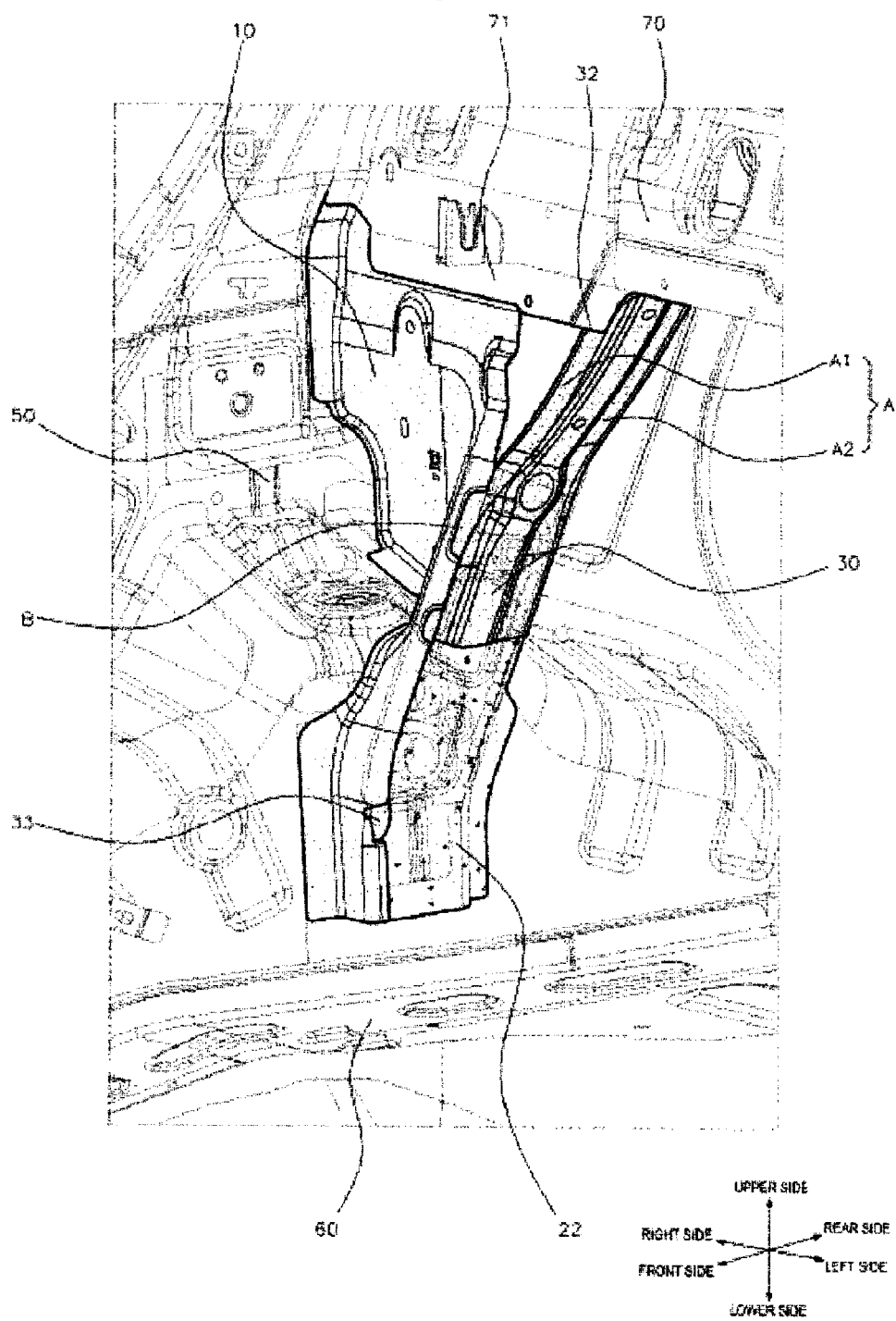
FIG. 2 is an image illustrating a first reinforcing flange A and a second reinforcing flange B in the structure of FIG. 1.

The reinforcing flange 31 according to the exemplary embodiment of the present invention includes a first reinforcing flange A positioned at an upper side with both side surfaces (front side surface A1 and rear side surface A2) being exposed, and a second reinforcing flange B extended downward from the first reinforcing flange A (see FIG. 2). The second reinforcing flange B is configured by attaching end 11 of the front side member 10 and end 21 of the rear side member 20 to a front surface (front side member) and a rear surface (rear side member) at a lower portion of the reinforcing flange 31.

As illustrated in FIG. 3, one end of the front side member 10 is welded on the body panel 50, and the other end which is end 11 of the front side member 10, configuring the second reinforcing flange B, is mounted in a vertical direction from a surface of the body panel 50 (that is, left to right direction of the vehicle body).

Figure 5:
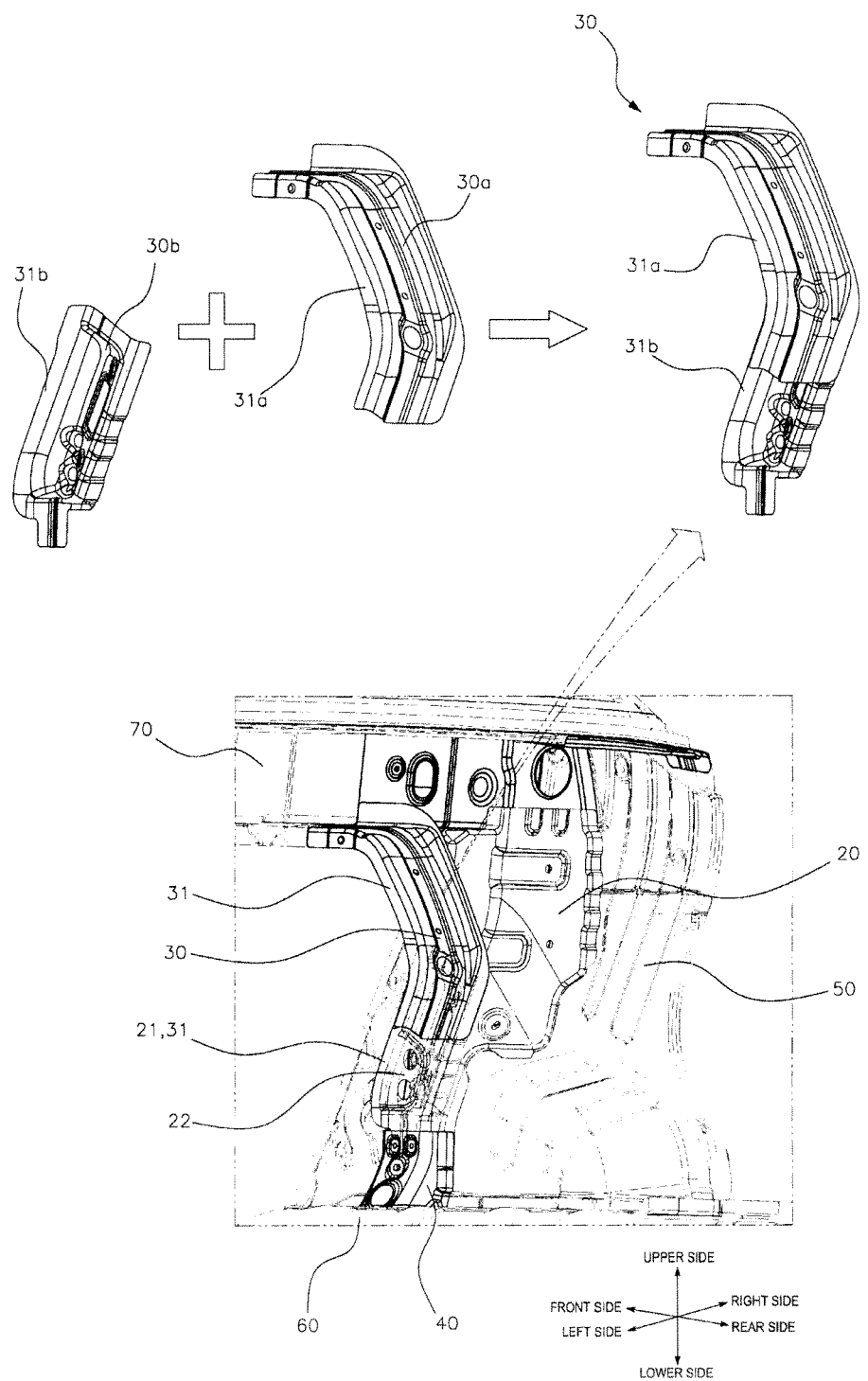
FIG. 5 is an exploded view and enlarged view, respectively, illustrating a support member according to an embodiment of the present invention.

FIG. 5 shows that the support member 30 includes a support portion 30a having an upper end, which is connected to the upper member 70 and in a curved shape with a predetermined angle, and an upper end flange 31a which configures the first reinforcing flange A; and a body fastening portion 30b connected to a lower portion of the support portion 30a and configured to be in contact with and be welded to the body panel 50.

In the embodiment of the present invention, as seen in FIGS. 3, 4 and 5, the rear side member 20 has a closed section structure together with the front side member 10, the rear side member 20 has a cover portion 22 which has a bent shape as illustrated in detail in FIG. 4 in order to cover the body fastening portion 30b (in FIG. 5), the edge 21 is bent and attached to the support member 30 to configure the second reinforcing flange B.

A reinforcing panel 40 (see FIG. 5), which is attached to the floor panel 60 and the body panel 50, is coupled with lower ends of the rear side member 20 and the front side member 10, and reinforcing panel 40 and/or the cover portion 22 may have welding holes 23 and 41 for an welding gun to enter to weld the support member (the body fastening portion of the support member) and the rear side member 20.

Figure 6:
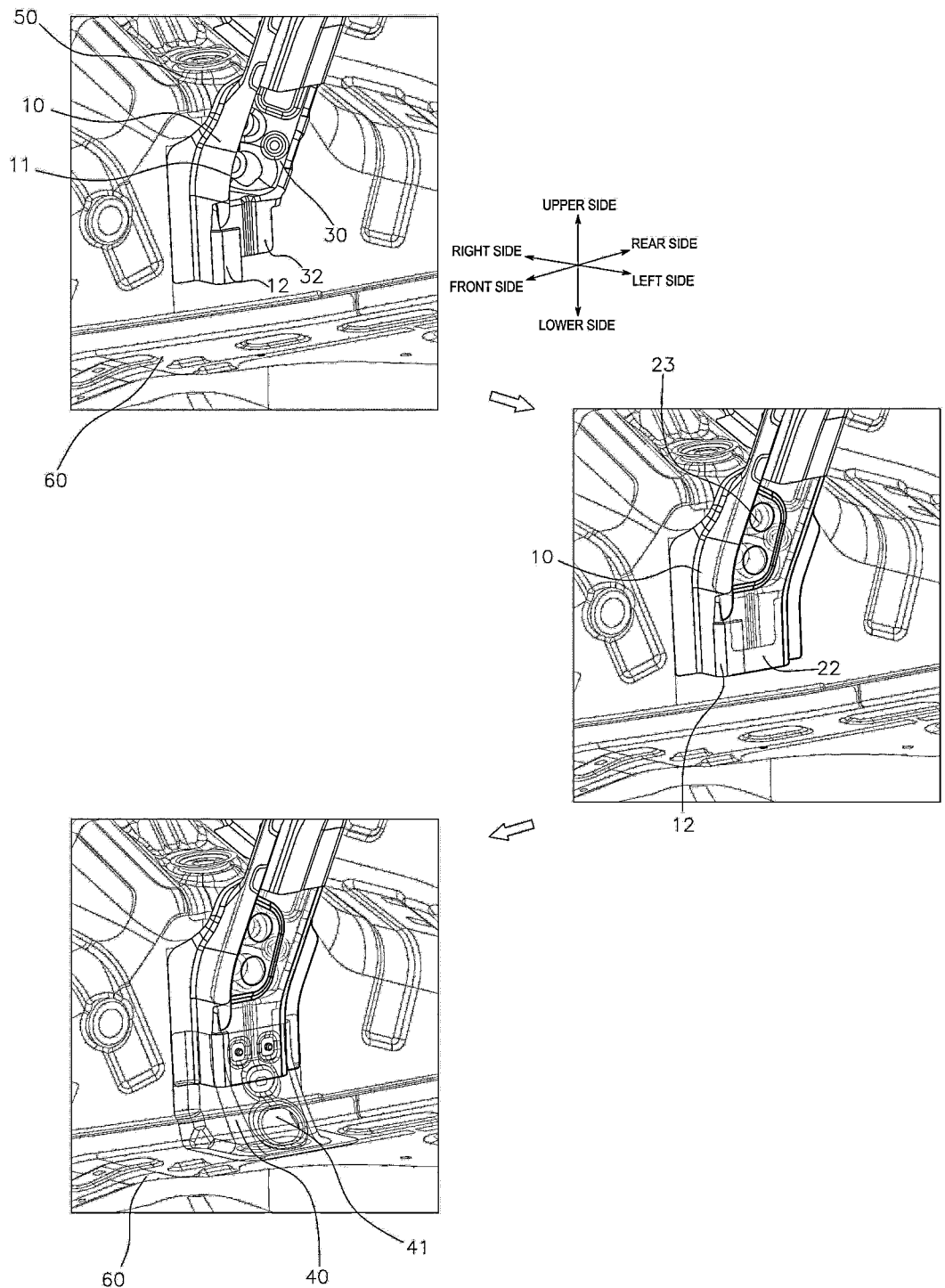
FIG. 6 is a view including perspective views illustrating aspects in which a side member and a support member are coupled at a lower portion, in accordance with an embodiment of the present invention.

A method of coupling the side member 5, the support member 30, and the reinforcing panel 40 according to the embodiment of the present invention is illustrated in FIG. 6. Referring to the drawing, a lower end portion 12 of the front side member 10 is bent toward a rear side to be in surface contact with a lower end of the body fastening portion 30b (in FIG. 5). Further, the cover portion 22 in the lower side of the rear side member 20 is connected to the front side member 10 so as to form a closed section.

Each end of the front side member 10 and the rear side member 20 is attached to both sides of a lower end flange 31b of the body fastening portion 30b to form the second reinforcing flange B.

Referring to FIG. 6, the reinforcing panel 40 is attached to the body panel 50 and the floor panel 60 to cover a lower end of the cover portion 22 and the welding hole 41, which is for $CO_2$ welding the front side member 10, the rear side member 20, and the body fastening portion 30b, is formed at the reinforcing panel 40.

In the present disclosure, the body fastening portion 30b, which configures a lower end of the support member 30, is attached in the side member 5 having a closed section structure, and the reinforcing flange 31 is extended toward a lower portion of the side member 5, and as a result, there is an effect of target rigidity being satisfied without enlarging a size of the side member 5.

In addition, since the cover portion 22 may have the welding hole 23, welding connectivity of a lower end portion and a side portion between the rear side member 20 and the front side member 10 may be improved.

Accordingly, the size reduction of the side member 5 and the support member 30 may improve marketability by maximally securing a capacity of the trunk room while rigidity of the vehicle body and durability may be improved.

The embodiments disclosed in the present specification and the drawings are only specific examples for easy understanding of the present disclosure which is not limited thereto. Here, it is obvious to a person skilled in the art that besides the exemplary embodiments disclosed herein, various modifications can be made based on the technical spirit of the present disclosure.

What is claimed is:

1. A rear package tray mounted on right and left rear body panels of a vehicle which vertically stand at both sides of a floor panel of the vehicle, the rear package tray positioned between an interior and a trunk of the vehicle, the rear package tray comprising:
    a side member having a front side sub-member in the interior of the vehicle coupled to a rear side sub-member in the trunk of the vehicle, the side member mounted on one body panel;
    an upper member disposed at an upper side of the side member and extending from the right rear body panel to the left rear body panel in a first direction; and
    a support member having a first end connected to the upper member and a second end connected to the side member, the support member inclined and spaced apart from a connection portion between the side member and the upper member,
    wherein a reinforcing flange protrudes in the first direction from one edge of the support member.

2. The rear package tray of claim 1, wherein the reinforcing flange includes a first reinforcing flange portion positioned at an upper side of the support member and a second reinforcing flange portion positioned at a lower side of the support member adjacent the first reinforcing flange portion, each of the first and second reinforcing flange portions having two opposing surfaces, a front surface facing the front of the vehicle, and a rear surface facing the rear of the vehicle, wherein both opposing surfaces of the first reinforcing flange portion are uncovered, and one of the opposing surfaces of the second reinforcing flange portion is adjacent an end of the front side sub-member.

3. The rear package tray of claim 2, wherein the end of the front side sub-member, to which the second reinforcing flange portion is adjacent, is mounted in the first direction from a surface of the body panel,
    a lower end of the support member has a body fastening portion,
    the rear side sub-member has a cover portion, which has a bent shape in order to cover the body fastening portion, thereby forming a closed section structure together with the front side sub-member,
    and an end of the rear side sub-member is adjacent the other opposing surface of the second reinforcing flange portion.

4. The rear package tray of claim 3, wherein a reinforcing panel, which is attached to the floor panel and the body panel, is attached to a lower end of the side member.

5. The rear package tray of claim 4, wherein the reinforcing panel and the cover portion have one or more welding holes for a welding gun to enter to connect the support member and the rear side sub-member.

* * * * *